(12) United States Patent
Kim

(10) Patent No.: US 7,443,979 B2
(45) Date of Patent: Oct. 28, 2008

(54) PORTABLE COMMUNICATION TERMINAL HAVING A HOUSING CAPABLE OF BOTH SLIDING AND SWINGING

(75) Inventor: Young S. Kim, Los Altos, CA (US)

(73) Assignee: Samsung Electronics Co., Ltd (KR)

( * ) Notice: Subject to any disclaimer, the term of this patent is extended or adjusted under 35 U.S.C. 154(b) by 33 days.

(21) Appl. No.: 11/328,674

(22) Filed: Jan. 10, 2006

(65) Prior Publication Data
US 2006/0209505 A1 Sep. 21, 2006

(30) Foreign Application Priority Data
Mar. 21, 2005 (KR) .................. 10-2005-0023317

(51) Int. Cl.
*H04M 1/00* (2006.01)
(52) U.S. Cl. .............. 379/433.12; 379/433.11; 379/433.13; 455/575.4
(58) Field of Classification Search ........... 248/289.11, 248/917; 361/680; 379/433.01, 433.12, 379/433.13
See application file for complete search history.

(56) References Cited

U.S. PATENT DOCUMENTS

| | | | | |
|---|---|---|---|---|
| 5,494,447 A * | 2/1996 | Zaidan | .................. | 439/31 |
| 5,539,615 A * | 7/1996 | Sellers | .................. | 361/680 |
| 5,548,478 A * | 8/1996 | Kumar et al. | .................. | 361/681 |
| 6,397,078 B1 * | 5/2002 | Kim | .................. | 455/556.2 |
| 6,580,932 B1 * | 6/2003 | Finke-Anlauff | .................. | 455/566 |
| 6,658,272 B1 | 12/2003 | Lenchik et al. | | |
| 6,961,593 B1 * | 11/2005 | Lonka et al. | .................. | 455/573 |
| 7,065,835 B2 * | 6/2006 | Kuramochi | .................. | 16/357 |
| 7,092,747 B2 * | 8/2006 | Park et al. | .................. | 455/575.4 |
| 7,099,708 B2 * | 8/2006 | Ronkko | .................. | 455/575.1 |
| 7,110,797 B2 * | 9/2006 | Soejima | .................. | 455/575.1 |
| 7,149,557 B2 * | 12/2006 | Chadha | .................. | 455/575.1 |
| 7,162,283 B2 * | 1/2007 | Bae et al. | .................. | 455/575.4 |
| 7,200,423 B2 * | 4/2007 | Bum | .................. | 455/566 |
| 7,353,052 B2 * | 4/2008 | Yamasaki | .................. | 455/575.4 |
| 2003/0073414 A1 * | 4/2003 | Capps | .................. | 455/90 |
| 2003/0157957 A1 * | 8/2003 | Wendorff et al. | .................. | 455/550 |
| 2004/0206876 A1 * | 10/2004 | Kato | .................. | 248/349.1 |
| 2004/0252139 A1 * | 12/2004 | Takizawa et al. | .................. | 345/649 |
| 2005/0018394 A1 * | 1/2005 | Park et al. | .................. | 361/683 |

* cited by examiner

*Primary Examiner*—Michael G. Lee
*Assistant Examiner*—Paultep Savusdiphol
(74) *Attorney, Agent, or Firm*—The Farrell Law Firm, PC

(57) ABSTRACT

A portable communication terminal having a sliding/swinging housing is disclosed. The portable communication terminal includes a body housing; and a sliding/swinging housing which slides lengthwise along the body housing while being closely opposed to the body housing and is then swung to be placed in parallel to the body housing beside the body housing.

9 Claims, 4 Drawing Sheets

PORTABLE COMMUNICATION TERMINAL HAVING A HOUSING CAPABLE OF BOTH SLIDING AND SWINGING

PRIORITY

This application claims priority to an application entitled "Portable Communication Terminal Having A Housing Capable of Both Sliding And Swing" filed with the Korean Intellectual Property Office on Mar. 21, 2005 and assigned Serial No. 2005-23317, the contents of which are incorporated herein by reference.

BACKGROUND OF THE INVENTION

1. Field of the Invention

The present invention relates to a portable communication terminal using a digital communication system which includes a cellular phone, a Personal Digital Assistant (PDA), a Personal Communication System (PCS), a camera phone, a game phone, an internet phone and the like, and more particularly to a portable communication terminal having a housing which can perform both a sliding movement and folding movement.

2. Description of the Related Art

In general, "portable communication terminal" means an electronic device which a user can carry with him/her while communicating with another user by wireless. In consideration of portability, design of such a portable communication terminal has tended not only toward compactness, slimness and lightness, but also toward providing multimedia capabilities to allow the user to pursue a wider variety of functions. In particular, future portable communication terminals will be not only used for many functions while still being compact and light, but also be modified to be suitable for functioning in a multimedia environment and for providing internet access and functions.

Conventional portable communication terminals may be classified into various types according to their appearance, such as bar-type portable communication terminals, flip-type portable communication terminals, and folder-type portable communication terminals. The bar-type portable communication terminal has a single housing shaped like a bar. The flip-type portable communication terminal has a flip panel which is pivotably mounted to a bar-shaped housing by a hinge unit. The folder-type portable communication terminal has a folder coupled to a single bar-shaped housing by a hinge unit in such a manner that the folder can be rotated in order to be folded or unfolded from the housing.

Further, portable communication terminals may be classified as neck wearable type terminals and wrist wearable type terminals, according to the position or the way in which a user wears the terminal. The neck wearable type terminal is one which a user wears around the neck using a lanyard or necklace, while the wrist wearable type terminal is one which a user wears around the wrist.

Additionally, portable communication terminals may be classified as rotation-type terminals and sliding-type terminals according to the methods of opening and closing the terminals. In the rotation-type portable communication terminal, two housings are coupled to each other in a manner that one housing rotates to be opened or closed relative to the other while facing each other. In the sliding-type portable communication terminal, two housings are coupled to each other in a manner that one housing slides to be opened or closed relative to the other. The various classifications of portable communication terminals are easily understood by those skilled in the art.

Further, conventional portable communication terminals are now capable of allowing a voice communication as well as a high-speed data communication. That is, as consumer demands have increased, various services have been provided using wireless communication technology for transmitting and receiving data at a high speed.

It is a present tendency that a camera lens is mounted to the portable communication terminal, and that it is possible to transmit image signals and the like. As such, present portable communication terminals are provided with an embedded or external camera lens module. Therefore, it is possible to perform image communication with a desired partner or to photograph a desired subject.

However, the conventional sliding type portable communication terminal includes two housings, one of which can slide in only one direction with respect to the other housing. Also, the conventional sliding type portable communication terminal usually has only one display unit. Therefore, the conventional sliding type portable communication terminal cannot display a landscape mode screen. Likewise, the conventional swing type portable communication terminal also has only one display unit. Therefore, it is inconvenient for a user to view a landscape mode screen by using the conventional swing type portable communication terminal. Furthermore, the conventional sliding type or conventional swing type portable communication terminal has a small number of keys, so that it is inconvenient for the user to operate the keys with both hands.

SUMMARY OF THE INVENTION

Accordingly, the present invention has been made to solve the above-mentioned problems occurring in the prior art, and an object of the present invention is to provide a portable communication terminal having a housing capable of both sliding and swinging, which has advantages of both a sliding type portable communication terminal and a folding type portable communication terminal.

Another object of the present invention is to provide a portable communication terminal having a housing capable of both sliding and swinging, which has a display unit capable of displaying a landscape mode screen after being swung.

Still another object of the present invention is to provide a portable communication terminal having a housing capable of both sliding and swinging, which can be easily seated on a stand by using a battery pack while displaying a screen which it is convenient for a user to view.

In order to accomplish these objects, there is provided a portable communication terminal including a body housing; and a sliding swing housing which slides lengthwise along the body housing while being closely opposed to the body housing and is then swung to be placed in parallel to the body housing beside the body housing.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

Figure 1:
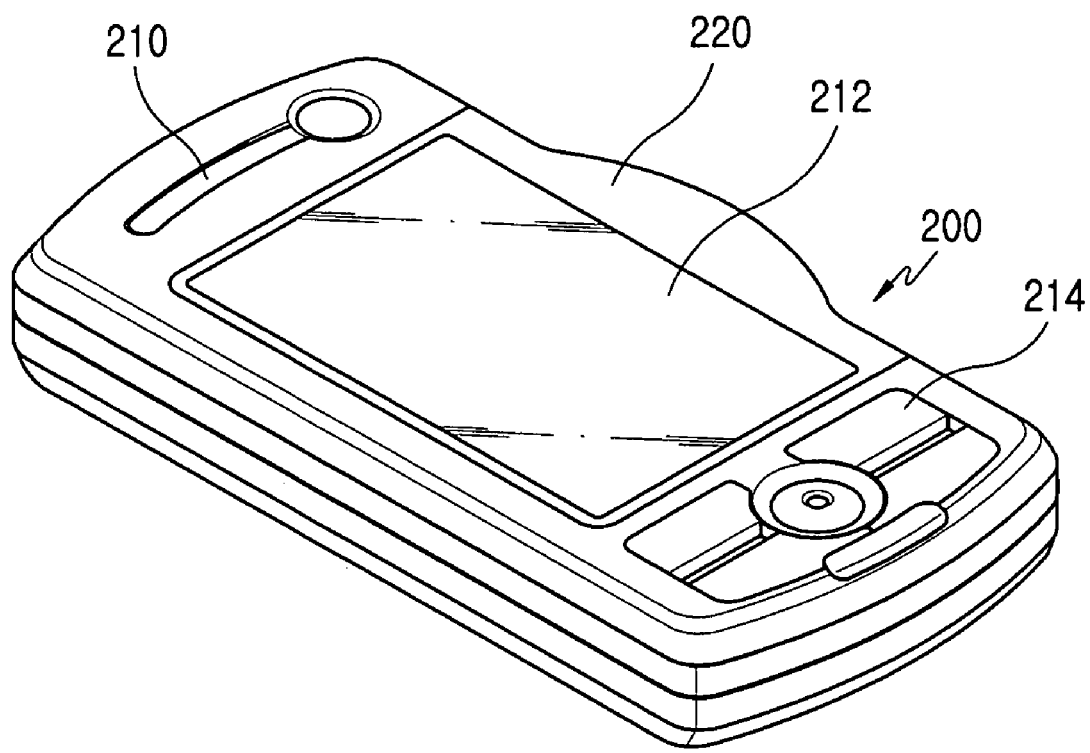
FIG. 1 is a perspective view of a portable communication terminal having a sliding swing housing according to a preferred embodiment of the present invention.
Figure 2:
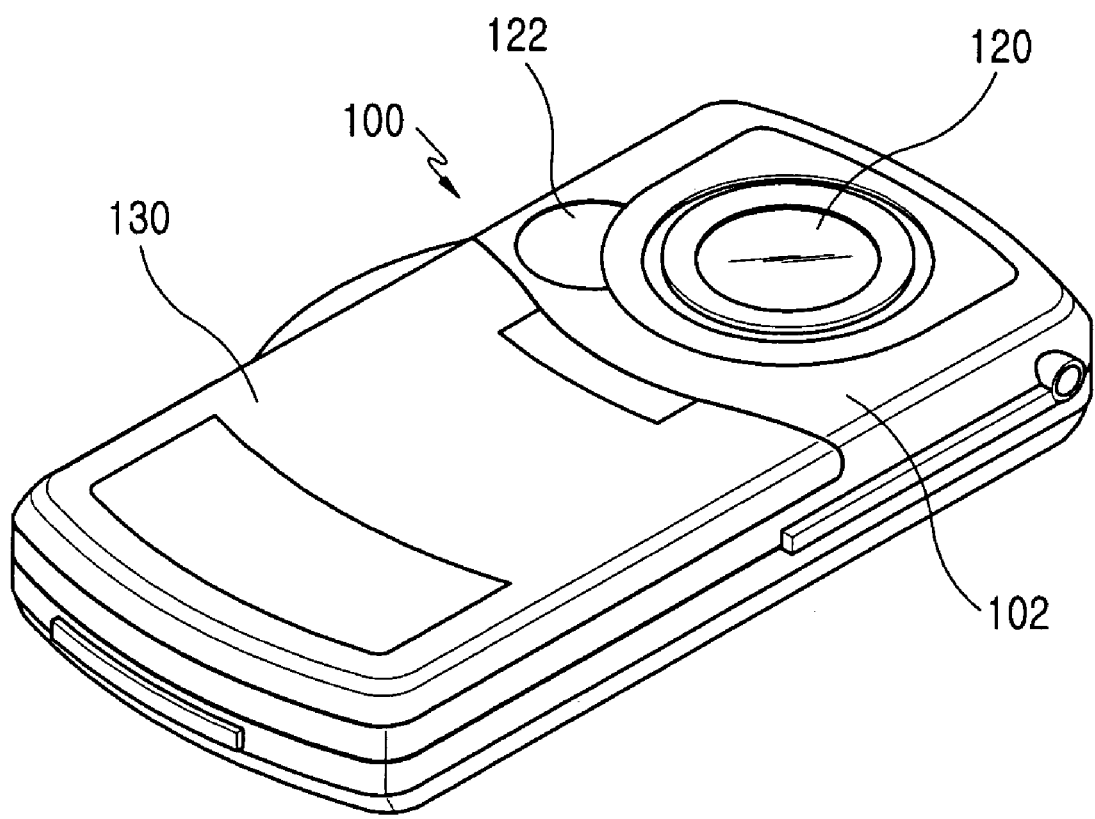
FIG. 2 is a perspective view of the portable communication terminal having a sliding swing housing according to the preferred embodiment of the present invention, which depicts a bottom surface of the portable communication terminal.
Figure 3:
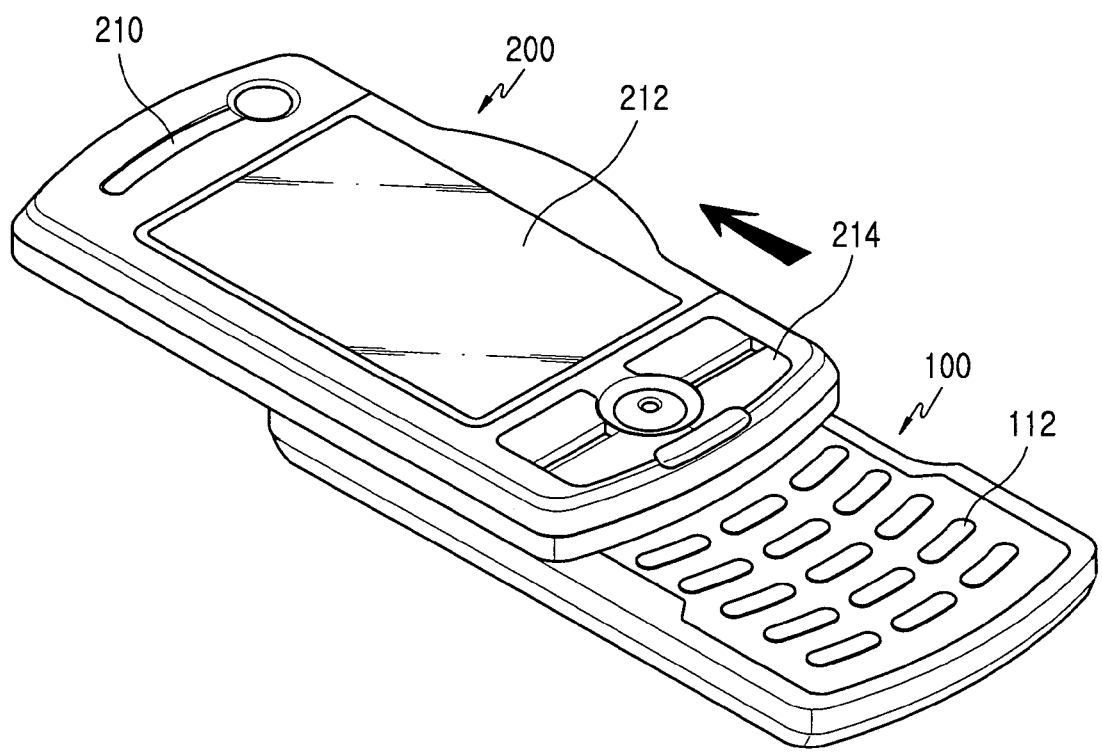
FIG. 3 is a perspective view of the portable communication terminal having a sliding swing housing according to the preferred embodiment of the present invention, in which the sliding swing housing is fully slid to open.
Figure 4:
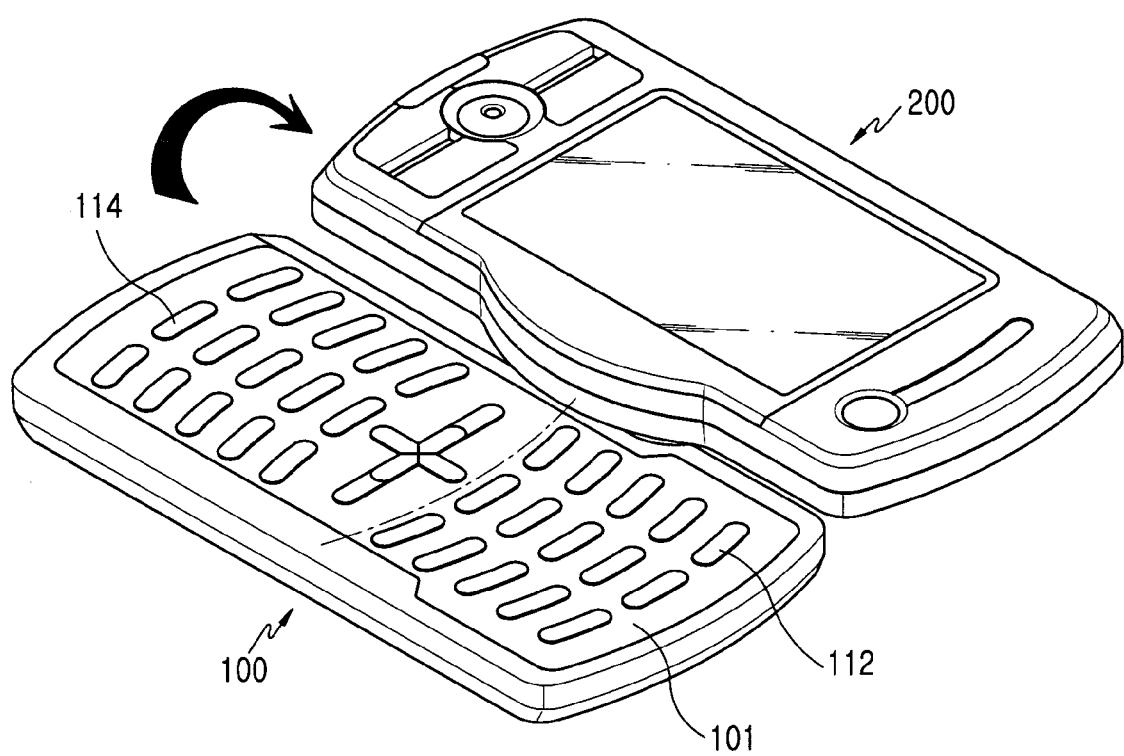
FIG. 4 is a perspective view showing the portable communication terminal having a sliding swing housing according to the preferred embodiment of the present invention, in which the sliding swing housing is fully unfolded.

As shown in FIGS. 1 to 4, the portable communication terminal according to the present invention serves as both a sliding type terminal and a folding type terminal. The portable communication terminal according to the present invention includes a body housing 100 and a sliding/swinging housing 200 which can be slid lengthwise along the body housing 100 while being closely opposed to the body housing 100 and can be then swung to be placed in parallel to the body housing 100 and beside the body housing 100. FIG. 3 shows the portable communication terminal in which the sliding/swinging housing 200 has been fully slid along the body housing 100. FIG. 4 shows the portable communication terminal in which the sliding/swinging housing 200 has been fully swung after the sliding. In the present embodiment, the sliding/swinging housing 200 can slide along the body housing 100 and can swing only in the state where the sliding/swinging housing 200 is fully closed onto the body housing 100. However, it should be noted that the portable communication terminal according to the present invention may have a structure in which the sliding/swinging housing 200 can slide along the body housing 100 in the state where the sliding/swinging housing 200 is fully closed onto the body housing 100 and then can swing after the sliding.

As shown in FIGS. 3 and 4, the body housing 100 has a plurality of first keys 112 and a plurality of second keys 114 arranged on an upper surface thereof. The first keys 112 and the second keys 114 are exposed or covered according to the siding and swing of the sliding/swinging housing 200. The first and second keys 112 and 114 are arranged adjacent to each other. Further, as shown in FIG. 3, when the sliding/swinging housing 200 is fully slid with respect to the body housing 100, the first keys 112 are positioned near third keys 214.

As shown in FIG. 1, a speaker unit 210, a display unit 212 and the third keys 214 are disposed on an upper surface of the sliding/swinging housing 200. The speaker unit 210 is arranged near the display unit 212 which is disposed adjacent to the third keys 214. A liquid crystal display unit or a touch screen can be used as the display unit 212. Further, the sliding/swinging housing 200 has a hinge support 220 at an intermediate portion of one side thereof, which protrudes outward from the side of the sliding/swinging housing 200. That is, a hinge shaft of the sliding/swinging housing 200 is disposed at the intermediate portion of the side of the sliding/swinging housing 200.

As shown in FIG. 4, when the sliding/swinging housing 200 is fully swung about 180 degrees, an upper surface 101 of the body housing 100 is completely opened so that the first and second keys 112 and 114 are fully exposed.

As shown in FIG. 2, the body housing 100 has a battery pack 130, a camera unit 120 and a light unit 122 which are disposed on a bottom surface 102 of the body housing 100.

It is preferred that the portable communication terminal has the structure shown in FIG. 1 or FIG. 2 when used in a camera mode, has the structure shown in FIG. 3 when used in a communication mode, and has the structure shown in FIG. 4 when used in a game mode or movie watching mode. In the state shown in FIG. 4, the display unit can display a wide landscape mode screen, thereby making it convenient for a user to view the displayed screen.

As described above, the portable communication terminal according to the present invention has the sliding swing housing which can slide and swing. Therefore, a user can select display modes of the display unit, for example, landscape mode or portrait mode. Also, the user can communicate with others conveniently by means of the portable communication terminal. In the state shown in FIG. 4, especially, the user can view a screen of the display unit in a landscape mode and can operate a plurality of first and second keys with both hands.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication terminal comprising:
a body housing having an upper surface; and
a sliding/swinging housing having a lower surface closely facing the upper surface, the sliding/swinging housing movably coupled to the body housing, the sliding/swinging housing being fully closed onto the body housing at a first position, the sliding/swinging housing sliding along the body housing from the first position to a second position while maintaining the lower surface being closely facing the upper surface, the sliding/swinging housing swinging from the second position to a third position while maintaining the lower surface parallel to and facing the upper surface, wherein the upper surface of the body housing is fully exposed when the sliding/swinging housing is completely swung in the third position.

2. The portable communication terminal as claimed in claim 1, wherein a hinge shaft is placed at an intermediate portion of a side of the body housing.

3. The portable communication terminal as claimed in claim 1, wherein the body housing has first keys and second keys arranged on the upper surface, the first keys including a plurality of keys which are exposed as the sliding/swinging housing is opened by a sliding movement or swinging movement and the second keys including a plurality of keys which are arranged adjacent to the first keys and are exposed when the sliding/swinging housing is opened by only the swinging movement.

4. The portable communication terminal as claimed in claim 3, further comprising third keys, wherein the first keys are placed adjacent to the third keys when the sliding/swinging housing is fully slid with respect to the body housing.

5. The portable communication terminal as claimed in claim 1, wherein the sliding/swinging housing further comprises a hinge support formed at an intermediate portion of a side thereof, the hinge support protruding from the side of the sliding/swinging housing.

6. The portable communication terminal as claimed in claim 5, further comprising third keys, wherein the first keys are placed adjacent to the third keys when the sliding/swinging housing is fully slid with respect to the body housing.

7. The portable communication terminal as claimed in claim 1, wherein the sliding/swinging housing has a speaker unit, a display unit and a plurality of third keys disposed at an upper surface thereof.

8. The portable communication terminal as claimed in claim 1, wherein the body housing further comprises a camera unit disposed at a bottom surface thereof.

9. The portable communication terminal as claimed in claim 1, wherein the sliding/swinging housing can be slid or swung from the first position.

* * * * *